INVENTOR
Frederick Druseikis
BY
W. A. Schuetz
ATTORNEY

June 8, 1971  F. DRUSEIKIS  3,583,021

REAR WINDOW WIPER

Filed Oct. 1, 1969  2 Sheets-Sheet 2

INVENTOR
Frederick Druseikis
BY
W. A. Schuetz
ATTORNEY

United States Patent Office 3,583,021
Patented June 8, 1971

3,583,021
REAR WINDOW WIPER
Frederick Druseikis, Dayton, Ohio, assignor to
General Motors Corporation, Detroit, Mich.
Filed Oct. 1, 1969, Ser. No. 863,424
Int. Cl. A47l 1/02
U.S. Cl. 15—250.13                                  8 Claims

ABSTRACT OF THE DISCLOSURE

In a preferred form, this disclosure relates to a window wiping apparatus for cleaning a window of a vehicle and which is adapted to be concealed within the well or recess adjacent the lower edge of the window when not in use. The window wiping apparatus includes a carriage supported for linear movement in opposite directions between first and second positions by a guide track, a windshield wiper supported by the carriage for pivotal movement relative thereto about an axis generally normal to the window and a drive mechanism for moving the wiper in opposite directions across the window through a substantially semi-elliptical path between a first position in which the wiper is disposed adjacent one edge of the window at one lateral side of the window and a second position in which the wiper is disposed adjacent the one edge at the opposite lateral side of the window. The drive mechanism includes a drive means for reciprocating the carriage between its position to move the wiper transversely of the window and a second means responsive to movement of the carriage between its positions to rotate the wiper through an arc of 180° to provide the semi-elliptical path.

---

The present invention relates to a window wiping apparatus for wiping a window of a vehicle, and in particular to a window wiping apparatus having a wiper which is simultaneously transversely and pivotally moved relative to the window to provide a wipe pattern which is substantially semi-elliptical in shape.

An important object of the present invention is to provide a new and improved window wiping apparatus for wiping a window of a vehicle, and which is of a relatively simple and economical construction and in which the window wiper is conjointly transversely and pivotally moved across the window to provide a wipe pattern which is substantially semi-elliptical in shape.

Another object of the present invention is to provide a new and improved window wiping apparatus for wiping a window of a vehicle and which includes a carriage supported by a guide track means for movement relative thereto through first and second strokes, a window wiper pivotally supported by the carriage for movement about an axis extending generally normal to the window and a drive mechanism operatively connected with the carriage and the wiper for moving the wiper transversely across the window while simultaneously pivoting the wiper throughout the strokes of movement of the carriage to cause the wiper to be moved in opposite directions across the window through a substantially semi-elliptical path.

Yet another object of the present invention is to provide a new and improved window wiping apparatus for cleaning a window of a vehicle and which includes a carriage supported by a guide track means for movement relative thereto in opposite directions through first and second strokes, a window wiper supported by the carriage for pivotal movement relative thereto about an axis extending generally normal to the window, a drive means for reciprocating the carriage through its strokes to move the wiper transversely in opposite directions across the window and a means responsive to movement of the carriage through its first and second strokes to cause said wiper to be conjointly pivoted from a position adjacent one edge of the window at one lateral side thereof to a position adjacent the one edge of the window at its opposite lateral side during each stroke of movement of the carriage.

Yet another object of the present invention is to provide a new and improved window wiping apparatus, as defined in the preceding objects, for wiping the rear window of a station wagon type vehicle.

A further object of the present invention is to provide a new and improved window wiping apparatus, as defined in the preceding objects, for wiping the rear window carried by a tailgate of a vehicle, and in which the wiper is parked in the recess or chamber at the upper end of the tailgate so as to be concealed from view when not in use.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 3 is an enlarged fragmentary sectional view taken approximately along line 3—3 of FIG. 1;

FIG. 4 is an enlarged fragmentary view with portions shown in section of part of the window wiping apparatus shown in FIG. 1;

FIG. 5 is an enlarged fragmentary sectional view with portions shown in elevation taken approximately along line 5—5 of FIG. 4; and FIG. 6 is a schematic wiring diagram for controlling operation of the window cleaning apparatus shown in FIG. 1.

The present invention provides a novel window wiping apparatus for wiping a window of a vehicle. Although the window wiping apparatus of the present invention could be used for wiping various windows including the front window or windshield of a vehicle, it is particularly susceptible for use in cleaning the rear window of a station wagon vehicle and thus, is herein shown and described as being used for the latter purpose.

Figure 1:
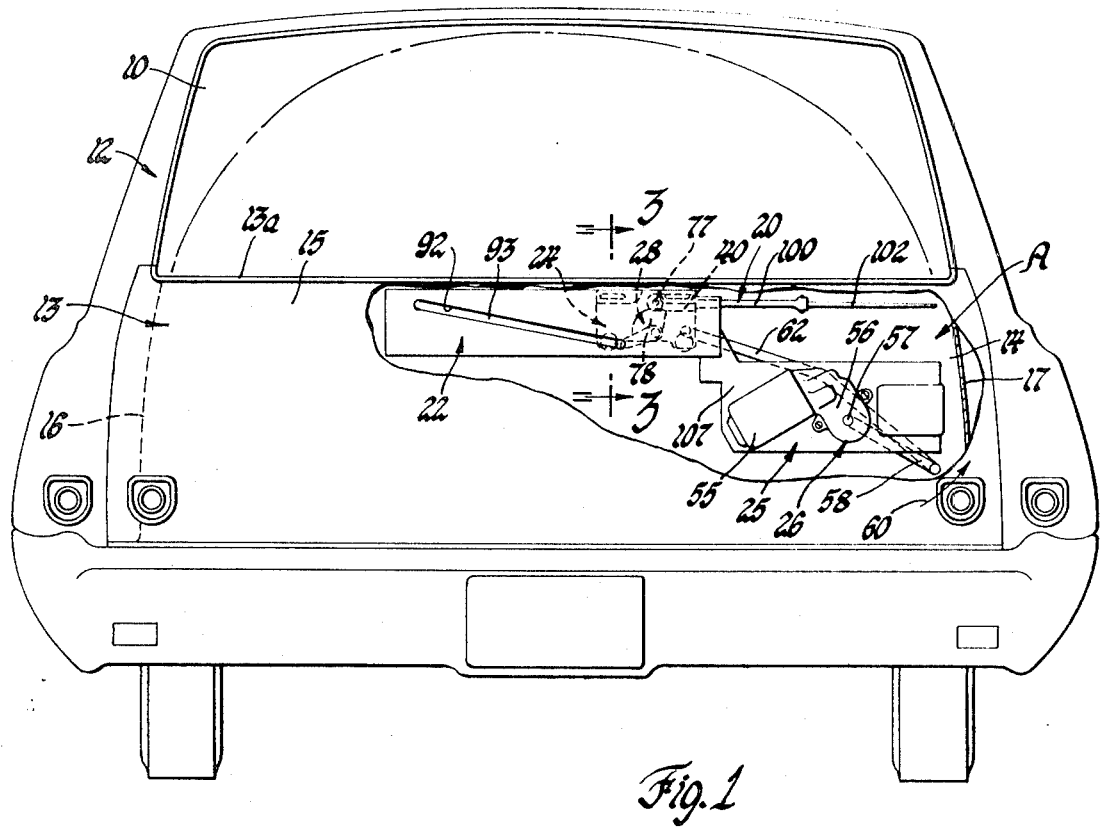
FIG. 1 is a fragmentary rear elevational view of a station wagon vehicle embodying the window wiping apparatus of the present invention.

As representing a preferred embodiment of the present invention, FIGS. 1–6 of the drawings show a window wiping apparatus A for wiping a rear window 10 of a station wagon 12. The station wagon 12 includes a rear tailgate 13 which is suitably supported in a conventional manner for movement about a horizontal axis between a closed position, as shown in FIG. 1, and an open position in which it is horizontally disposed and for movement about a vertical axis between a closed position, as shown in FIG. 1, and an open position in which it is vertically disposed. The tailgate 13 supports the rear window 10 for movement between closed and opened positions. The window 10, when in its closed position, projects upwardly above the upper end 13a of the tailgate 13.

The tailgate includes inner, outer and side walls or panels 14, 15 and 16 and 17, respectively, which define a chamber 18 (see FIG. 3) in which the window cleaning apparatus A is disposed. The upper end portion of the outer wall 15 of the tailgate 13 is spaced from the plane of the rear window 10 and defines therewith an elongated opening or slot 19 through which a wiper 20 of the window wiping apparatus A passes.

The window cleaning apparatus A comprises, in general, an elongated support means or guide track 22, carriage assembly or means 23 supported by the guide track 22 for linear movement in opposite directions therealong through first and second strokes, the wiper 20 which is pivotally supported by the carriage assembly 24 for movement about an axis extending generally normal to the window 10 and a drive mechanism 25 operatively connected with the carriage assembly 24 and the wiper 20 for moving the wiper 20 in opposite directions across the window through a substantially semi-elliptical path. The wiper 20 is moved between a first or parked position, as shown in FIG. 1, in which it is disposed adjacent the lower edge at the right side of the window and a second position, as shown by the dotted lines in FIG. 2, in which the wiper is disposed adjacent the lower edge of the window 10 at its left side. The drive mechanism 25 includes a first drive means 26 for reciprocating the carriage assembly 24 back and forth through its strokes to move the wiper 20 transversely across the window 10 and a second drive means 28 responsive to movement of the carriage assembly 24 through its strokes for conjointly pivoting the wiper from its first position, as shown in FIG. 1, to its second position, as shown by the dotted lines in FIG. 2, to provide a semi-elliptical or substantially semi-elliptical wipe pattern.

Referring to FIGS. 3 and 4, the guide track 22 extends horizontally within the tailgate 13 and is suitable secured to the outer panel structure 15 of the tailgate 13. The guide track 22 comprises an elongated sheet metal member having a substantially reverse C-shaped cross-sectional shape, as viewed in FIG. 3. The guide track 22 at its upper end, as viewed in FIG. 3, is formed so as to provide a substantially trapezoidal shaped channel 32 and at its lower end is shaped so as to provide a generally V-shaped channel 34.

The guide track 22 supports the carriage assembly 24 for movement in opposite directions relative thereto. The carriage assembly 24 comprises a sheet metal body 40 which is generally of an inverted L-shaped cross-sectional shape. As viewed in FIG. 4, the body 40 adjacent the left and right ends of its upper leg portions 40a carries a roller 42. The rollers 42 are rotably supported by cylindrical pins or stub shafts 44 suitably secured to the upper leg portions 40a of the body 40. The rollers 42 have tapered sides 42a which are complementary with the tapered sides of the channel 32. The body 40 at its left and right sides adjacent the lower edge of its downwardly extending leg 40b carries a roller 48. The rollers 48 are rotatably supported on pins or stub shafts 50 suitably secured to the downwardly extending leg 40b of the body 40 and have rounded peripheries, as viewed in cross section. The rollers 48 are cradled within the V-shaped channel 34 of the guide track 22.

Figure 2:
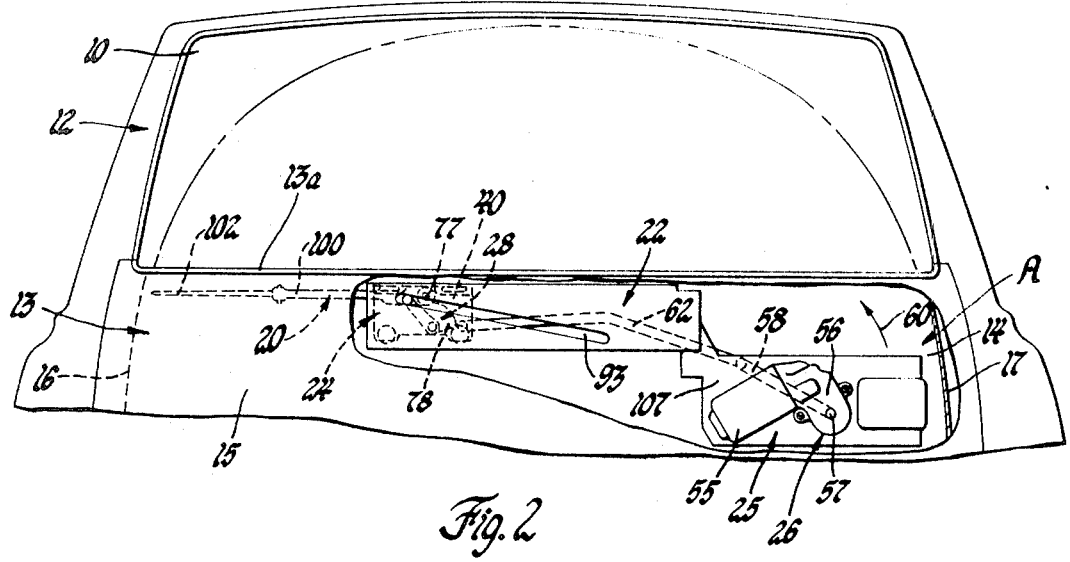
FIG. 2 is a fragmentary rear elevational view like that shown in FIG. 1 but showing different parts thereof in different positions.

The carriage assembly 24 is adapted to be reciprocated by the drive means 26 through first and second strokes between a first position, as shown in FIG. 1, in which the carriage is positioned adjacent the right end of the guide track 22 and a second position, as shown in FIG. 2, in which the carriage is positioned adjacent the left end of the guide track 22. As the carriage 24 is reciprocated, the rollers 48 roll in the guide channel 34 and with the movement of the carriage being laterally guided by the guide rollers 42. The drive means 26 comprises a selectively energizable electric wiper motor 55 whose output shaft is operatively connected with a gear reduction unit 56. The gear reduction unit has an output shaft 57 which is fixed to one end of a crank arm 58. The wiper motor 55 and gear reduction unit 56 could be of any suitable or conventional construction and function to rotate the crank arm 58 in the direction of the arrow 60. The crank arm 58 at its end remote from the gear reduction unit is pivotally connected to one end of a drive link 62, the other end of the drive link 62 being pivotally connected via a pivot pin means 64 to the body 40 of the carriage assembly 24. Rotation of the crank arm 58 causes the carriage assembly 24 to be reciprocated along the guide track between its first and second positions to cause the windshield wiper 20 to be moved in opposite directions transversely of the window 10.

The windshield wiper 20 as it is being moved transversely in opposite directions across the window 10 is also conjointly pivoted or rotated by the second drive means 28 between a first position, as shown in FIG. 1, in which the wiper is horizontally disposed within the recess 19 adjacent the lower edge of the window 10 at its right side and second position, as shown in FIG. 2, in which the wiper 20 is horizontally disposed within the recess 19 adjacent the lower edge of the window 10 at its left side. The second drive means 28 comprises a drive pivot 70 rotatably supported in bushing portions 71 and 72 of a housing 73 and a cover 74, respectively. The housing 73 in turn is suitably secured to the body 40 of the carriage assembly 24 and the bushing portion 71 extends through an opening 75 in the leg 40b of the body 40. The drive pivot 70 projects outwardly of the housing 73 and the cover 74 is secured to the housing 73 by screws 76. The wiper 20 is fixed to the drive pivot 70 at its outwardly projecting end and a pinion gear 77 is fixed to the drive pivot 70 intermediate its ends. The pinion gear 77 is in meshed engagement with a sector gear 78 fixed to a pivot pin means 80, pivot pin means 80 being rotatably journaled in bushing portions 81 and 82 of the housing 73 and cover 74, respectively.

The sector gear 78 is rotated to pivot or rotate the wiper 20 in response to movement of the carriage assembly 24. The sector gear is respectively rotated in the direction of the arrows 85 and 86 during movement of the carriage assembly 24 through its first and second strokes to cause the wiper 20 to be oscillated 180° or substantially 180° during each stroke of movement of the carriage assembly 24. This movement of the sector gear 78 is caused by a cam follower means 90 and a cam track 92. The cam track 92 comprises a linear slot 93 formed within the guide track 22, the side edges of the guide slot 93 being defined by inwardly extending flanges 94 and 95 integral with the cam track 92. The cam slot 93 is located in the plane generally parallel to the plane of the window 10 and extends at an acute angle with respect to the upper end 13a of the tailgate 13. That is, the cam slot 93 extends downwardly with respect to the upper end of the tailgate 13, as viewed from left to right in FIG. 1. The cam follower means 90 includes a cam follower roller 96 pivotally connected to one end of a cam follower arm 97 and which is received within the cam slot 93. The cam follower arm 97 at its other end is fixed to the pivot pin means 80.

The window wiper 20 could be of any suitable or conventional construction and includes a wiper arm 100 which is fixed to the drive pivot 70. The wiper arm 100 is preferably in the form of a cantilever spring which is self-biased toward the plane of the window 10. The wiper 100 further includes a wiper blade 101 in engagement with the window 10 and blade holder assembly 102 which is pivotally connected to the wiper arm 100 at its end remote from the drive pivot 70 for movement about an axis parallel to the plane of the window 10. The wiper motor 55 and gear reduction unit 56 are suitably secured to a support 107 which in turn is secured to the outer panel structure 15 of the tailgate 13.

It should be noted that the rollers 42 and 48, gears 77 and 78 and cam follower roller 96 are preferably made from a plastic material, and that the guide track 22, body 40, housing 73, cover 74 and the various links are made from sheet metal material. This provides an economical construction and simplified manufacture and assembly of the wiper apparatus A.

Operation of the window wiping apparatus A will be described with reference to the schematic control circuit means or diagram shown in FIG. 6. The control circuit means includes the wiper motor 55 which has an armature 105, field winding 103 and a parking switch 104. The parking switch 104 is self-biased toward a closed position, but normally held open when the wiper apparatus A is not operating by a cam 106 drivingly connected with the armature 105 of the wiper motor 55. The control circuit means also includes a manually operable, normally open switch 108 suitably located on the dash board of the vehicle, DC battery 110 having one terminal connected to ground $G_1$ and an ignition switch 111.

When the wiper apparatus A is not operating, the wiper 20 thereof will be disposed in its parked position, as shown in FIG. 1, in which the wiper 20 is disposed substantially horizontally and located within the slot 19 adjacent the right side of the tailgate 13. When the operator desires to operate the wiper system during running operation of the vehicle he need merely move the manually operable switch 108 to its closed position, as shown by the dotted lines in FIG. 6. Movement of the switch 108 to its closed position causes circuits to be completed for energizing the armature 102 and the field windings 103 of the wiper motor 55. These circuits are from battery 110, wire conductor 112, fuse 113, wire conductor 114, armature 102, wire conductor 115, now closed manually operable switch 108, wire conductor 116, now closed ignition switch 111, since the vehicle is running, wire conductor 117 to ground $G_2$ and from wire conductor 114, field windings 103, wire conductor 115, now closed manually operable switch 108, wire conductor 116, now closed ignition switch 111, wire conductor 117 to ground $G_2$.

When the wiper motor 55 is energized it will cause the crank arm 58 to be rotated in the direction of the arrow 60 which in turn causes the carriage assembly 24 to be moved through its first stroke from its first position, as shown in FIG. 1, to its second position, as shown in FIG. 2. Movement of the carriage assembly 24 through its first stroke causes the wiper 20 to be moved transversely, toward the left, as viewed in FIG. 1, of the window 10. At the same time that the carriage 24 is being moved through its first stroke, the cam follower means 90 will cause the sector gear 78 to be rotated in the direction of the arrow 85, which in turn will cause the pinion gear 77 to be rotated in the opposite direction and the wiper 20 to be pivotally moved from its position, as shown in FIG. 1, toward its position, as shown in FIG. 2.

This combined transverse and pivotal movement of the wiper 20 during the first stroke of movement of the carriage assembly 24 causes the wiper 20 to move in a semi-elliptical path, as shown by the phantom lines in FIGS. 1 and 2. This provides a semi-elliptical shaped wipe pattern whereby a very large area of the tailgate window 10 is wiped.

When the carriage 24 is being reciprocated in the reverse direction through its second stroke, reverse movement of the wiper 20 through its elliptical path takes place. Although the speed at which the wiper 20 is moved back and forth across the window 10 could be varied as desired, it has been found that a speed of approximately 10 wipes or strokes per minute is sufficient to adequately remove all the vision obscuring material from the rear window 10 of the station wagon vehicle.

When the operator no longer desires to operate the wiper apparatus A, he will merely move the manually operable switch 108 to its open posoition, as shown by the solid lines in FIG. 6. Although the opening of the switch 108 breaks the aforementioned circuits for the armature 105 and the field windings 103 of the wiper motor 55, the wiper motor 55 nevertheless remains energized until the wiper 20 reaches its parked position, as shown in FIG. 1. This is due to the provision of the parking switch 104. If the wiper 20 was not in its parked position when the switch 108 was opened, the cam 106 would be in a position which allowed the switch 104 to be self-biased to its closed position to provide holding circuits for the armature 105 and the field windings 103 of the wiper motor 55. These circuits are from battery 110, wire conductor 112, fuse 113, wire conductor 114, armature 105, wire conductor 115, now closed park switch 104, wire conductor 120, to ground $G_3$ and from wire conductor 114, field winding 103, wire conductor 115, now closed park switch 104, wire conductor 120, to ground $G_3$. These holding circuits maintain the wiper motor 55 energized until the wiper motor reaches its parked position as shown in FIG. 1, at which time the cam 106 will have moved the park switch 104 to its open position to de-energize the aforementioned circuits to de-energize the wiper motor 55.

From the foregoing, it should be apparent that a novel wiper apparatus has been provided for wiping a very large area of a window of a vehicle. Moreover, it should be apparent that since the guide track 22 carriage assembly 24 and the drive means are made from sheet metal and plastic materials, that the overall wiper apparatus is of a relatively simple and economical construction. Additionally, it should be noted that by parking the wipers within the recess 19 beneath the upper edge 13a of the tailgate 13 that the wipers will be concealed from view when not in use and thus enhance the esthetic appearance of the vehicle.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A window wiping apparatus for wiping a window of a vehicle comprising: an elongated support means which is adapted to be carried by the vehicle adjacent one edge of the window; a carriage supported by said support means and being movable in opposite directions therealong between first and second positions, a windshield wiper which is adapted to engage the window and which is supported by said carriage for pivotal movement relative thereto about an axis extending generally normal to the window; and a drive mechanism for moving said wiper in opposite directions across the window through a substantially semi-elliptical path between a first position in which said wiper is disposed adjacent said lower edge of the window at one lateral side of the latter and a second position at which said wiper is disposed adjacent said lower edge at the opposite lateral side of the window, said drive mechanism including a drive means for reciprocating said carriage between said first and second position to move said wiper transversely across the window and a second means for conjointly pivoting said wiper between its first and second positions while said carriage is being moved between its positions.

2. A window wiping apparatus as defined in claim 1 wherein said second means comprises a pinion gear rotatably supported by said carriage and to which one end of the wiper is secured, a sector gear in meshed engagement with the pinion gear and rotatably supported by the carriage, a linearly extending cam track disposed generally parallel to the plane of the window and which extends at an acute angle with respect to said one edge of the window and a follower means having one end disposed within said cam track and the other end secured to the sector gear whereby said carriage as it is moved between its first and second positions causes said sector gear to be rotated which in turn causes the wiper to be rotated between its positions.

3. A window wiping apparatus for use in wiping a tailgate window of a station wagon vehicle comprising: an elongated guide track means which is adapted to be carried by the tailgate of the vehicle; a carriage supported by said guide track means and being movable in opposite directions therealong through first and second strokes between first and second positions; a windshield wiper which is adapted to engage the tailgate window of the vehicle and which is supported by said carriage for rotational movement relative thereto about an axis extending generally normal to the tailgate window; and a drive mechanism for moving said wiper in opposite directions across the tailgate window through a substantially semi-elliptical path between a first position in which said wiper is disposed adjacent said edge at one lateral side of the window and a second position in which said wiper is disposed adjacent said edge at the opposite lateral side of the window, said drive mechanism comprising a drive means for reciprocating said carriage through its first and second strokes to move said wiper transversely of the window and a second means for conjointly rotating said wiper from its first position toward its second position during said first stroke of movement of the carriage and from its second position toward its first position during said second stroke of movement of the carriage.

4. A window wiping apparatus as defined in claim 3 wherein said second means comprises a pinion gear rotatably supported by said carriage and to which one end of the wiper is secured, a sector gear in meshed engagement with the pinion gear and rotatably supported by the carriage, a linearly extending cam track disposed generally parallel to the plane of the window and which extends at an acute angle with respect to said one edge of the window and a follower means having one end disposed within said cam track and the other end secured to the sector gear whereby said carriage as it is moved between the first and second positions causes said sector gear to be rotated which in turn causes the wiper to be rotated between its positions.

5. A window wiping apparatus as defined in claim 4 wherein said drive means comprises an electric motor, a crank arm operatively connected with the motor and being rotated thereby, and a drive link having one end pivotally connected to the crank arm and its other end pivotally connected to the carriage for reciprocating the carriage through its first and second strokes between its first and second positions.

6. In combination with an automobile vehicle having a window and structure defining an elongated recess adjacent one edge thereof; a window cleaning apparatus for cleaning the window and which is adapted to be disposed within said recess and concealed from view when not in use, said window cleaning apparatus comprising an elongated guide track carried by the vehicle and extending substantially parallel with the window, a carriage supported and guided by said guide track for linear movement in opposite directions therealong through first and second strokes between first and second positions; a windshield wiper which is adapted to engage the window and which is connected at one end to a drive pivot rotatably supported by the carriage for rotatable movement relative thereto about an axis extending generally normal to the window; and a drive mechanism for moving said wiper in opposite directions across the window through the substantially semi-elliptical path between a first position in which said wiper is disposed adjacent said edge of the window within said recess at one lateral side of the window and a second position in which said wiper is disposed adjacent said edge within said recess at the opposite lateral side of the window; said drive mechanism comprising a drive means for reciprocating said carriage through its first and second strokes between its first and second positions to move said wiper transversely of the window and a second means for conjointly rotating said wiper through an arc of substantially 180° during each stroke of movement of said carriage, said second means comprising a pinion gear secured to said drive pivot, a sector gear rotatably supported by the carriage and in meshed engagement with the pinion gear, a linearly extending cam track formed within said guide track and which extends at an acute angle with respect to the edge of the window and a cam follower means having one end disposed within said cam track and its other end secured to said sector gear whereby said carriage as it is moved through each of its strokes causes said sector gear to be rotated to rotate said wiper through an arc of substantially 180°.

7. In combination with the vehicle having a tailgate movable between open and closed positions and which supports a rear window and is provided with a substantially horizontally disposed open top recess adjacent the lower edge of the window, a window cleaning apparatus carried by the tailgate for cleaning the rear window, said window cleaning apparatus comprising: an elongated guide track means which is adapted to be carried by the tailgate adjacent the lower edge of the window; a carriage supported by said guide track means and being movable in opposite directions therealong through first and second strokes between first and second positions; a windshield wiper in engagement with said rear window and which is supported by said carriage for pivotal movement relative thereto about an axis extending generally normal to the windshield; and a drive mechanism for moving said wiper in opposite directions across the window through a substantially semi-elliptical path between the first position in which said wiper is disposed adjacent said lower edge of the window within said recess at one lateral side of the window and the second position in which the wiper is disposed adjacent said lower edge within said recess at the opposite side of the window, said drive mechanism comprising a drive means for reciprocating said carriage between its positions to move said wiper transversely across the rear window and a second means responsive to movement of said carriage between its positions for conjointly rotating said wiper through an arc of substantially 180°.

8. A window wiping apparatus as defined in claim 7 wherein said second means comprises a pinion gear rotatably supported by said carriage and to which one end of the wiper is secured, a sector gear in meshed engagement with the pinion gear and rotatably supported by the carriage, a linearly extending cam track disposed generally parallel to the plane of the window and which extends at an acute angle with respect to the lower edge of the window and a cam follower means having one end disposed within said cam track and the other end secured to the sector gear whereby said carriage as it is moved between the first and second positions causes said sector gear to be rotated which in turn causes the wiper to be rotated through an arc of substantially 180°.

References Cited
UNITED STATES PATENTS

| | | | |
|---|---|---|---|
| 1,661,388 | 3/1928 | Sather | 15—250.21 |
| 2,845,803 | 8/1958 | Price | 15—250.17 |
| 3,112,510 | 12/1963 | Forbush | 15—250.17 |
| 3,362,236 | 1/1968 | Druseikis | 15—250.17 |

ROBERT W. JENKINS, Primary Examiner

U.S. Cl. X.R.

15—250.29